US010291512B2

(12) United States Patent
Moiseenko et al.

(10) Patent No.: US 10,291,512 B2
(45) Date of Patent: May 14, 2019

(54) INTEREST MESSAGE PATH STEERING AND MULTI-PATH TRACEROUTE IN INFORMATION-CENTRIC NETWORKING

(71) Applicant: CISCO TECHNOLOGY, INC., San Jose, CA (US)

(72) Inventors: Ilya V. Moiseenko, San Jose, CA (US); David R. Oran, Cambridge, MA (US); James Cameron Gibson, Belmont, MA (US)

(73) Assignee: Cisco Technology, Inc., San Jose, CA (US)

( * ) Notice: Subject to any disclaimer, the term of this patent is extended or adjusted under 35 U.S.C. 154(b) by 80 days.

(21) Appl. No.: 15/479,144

(22) Filed: Apr. 4, 2017

(65) Prior Publication Data

US 2018/0077052 A1 Mar. 15, 2018

Related U.S. Application Data

(60) Provisional application No. 62/393,823, filed on Sep. 13, 2016.

(51) Int. Cl.

*H04L 12/707* (2013.01)
*H04L 12/26* (2006.01)

(Continued)

(52) U.S. Cl.

CPC ............ *H04L 45/24* (2013.01); *H04L 1/1861* (2013.01); *H04L 43/10* (2013.01); *H04L 45/122* (2013.01);

(Continued)

(58) Field of Classification Search

CPC ....... H04L 45/24; H04L 45/122; H04L 43/10; H04L 1/1861

(Continued)

(56) References Cited

U.S. PATENT DOCUMENTS

2003/0145105 A1* 7/2003 Desineni ................ H04L 41/12 709/238
2005/0026601 A1* 2/2005 Chuey ................... G08C 17/02 455/418

(Continued)

OTHER PUBLICATIONS

U.S. Appl. No. 15/490,588, filed Apr. 18, 2017, entitled "System and Method to Bypass the Forwarding Information Base (FIB) for Interest Packet Forwarding in an Information-Centric Network (ICN) Environment," Inventor(s): Ilya V. Moiseenko, et al.

(Continued)

*Primary Examiner* — Jae Y Lee
*Assistant Examiner* — Jean F Voltaire

(57) ABSTRACT

In one embodiment, path routing in a node fabric of an information-centric network (ICN) includes transmitting a request from a source application to an upstream node via node faces of nodes in the node fabric along a path encoded in a Path Steering Value (PSV); and receiving at the source application from the upstream node a reply that travels along a return path encoded in the PSV. The PSV is generated by pairwise encoding pairs of node faces successively traversed by the reply and is represented by a deterministically decodable pairing function. Node face identifiers can be deterministically, i.e., uniquely, decoded from the PSV. The deterministically decodable pairing function is selected from a Cantor function, a Hopcroft and Ullman variant of the Cantor function, Hilbert curve algorithm, Morton code, and a bitwise pairing function.

20 Claims, 7 Drawing Sheets

(51) Int. Cl.
*H04L 1/18* (2006.01)
*H04L 12/733* (2013.01)
*H04L 29/06* (2006.01)
*H04L 12/927* (2013.01)
*H04L 29/08* (2006.01)
*H04L 12/911* (2013.01)

(52) U.S. Cl.
CPC ........ *H04L 47/805* (2013.01); *H04L 63/0414* (2013.01); *H04L 65/80* (2013.01); *H04L 47/70* (2013.01); *H04L 63/0428* (2013.01); *H04L 67/306* (2013.01); *H04L 67/322* (2013.01)

(58) Field of Classification Search
USPC .......................................................... 370/389
See application file for complete search history.

(56) References Cited

U.S. PATENT DOCUMENTS

| | | | | |
|---|---|---|---|---|
| 2009/0024833 | A1* | 1/2009 | Deneroff | G06F 15/17343 712/29 |
| 2009/0086644 | A1* | 4/2009 | Kompella | H04L 43/0811 370/248 |
| 2013/0151584 | A1* | 6/2013 | Westphal | H04L 67/06 709/202 |
| 2015/0032892 | A1* | 1/2015 | Narayanan | H04L 47/70 709/226 |
| 2016/0043963 | A1 | 2/2016 | Oran | |
| 2016/0164792 | A1 | 6/2016 | Oran | |
| 2016/0173410 | A1* | 6/2016 | Lopez | H04L 47/805 370/230 |

OTHER PUBLICATIONS

"Configuring MPLS LSP Multipath Tree Trace," Cisco Nexus 7000 Series NX-OS MPLS Configuration Guide, Cisco Systems, Inc., Dec. 2013, 28 pages.
"Maximum Transmission Unit," from Wikipedia, the free encyclopedia, Jan. 4, 2017, 6 pages.
"MPLS LSP Multipath Trace," Cisco Systems, Inc., Sep. 2, 2015, 5 pages.
"NDN Packet Format Specification 0.2-2 documentation Data Packet," Named Data Networking, First published on or about Jul. 22, 2014; 3 pages.
"NDN Packet Format Specification 0.2-2 documentation Interest Packet," Named Data Networking, First published on or about Jul. 22, 2014; 5 pages.
"Pairing Function," from Wikipedia, the free encyclopedia, Oct. 9, 2016; 5 pages.
Adams, A., et al., "Protocol Independent Multicast—Dense Mode (PIM-DM): Protocol Specification (Revised)," Network Working Group RFC 3973, Jan. 2005; 61 pages.
Arumaithurai, M., et al., "Exploiting ICN for Flexible Management of Software-Defined Networks," Information-Centric Networking, ACM, Sep. 24-26, 2014, 10 pages; https://pdfs.semanticscholar.org/72fa/28f5e35d72d17a1e8bfe186707645d8d180b.pdf.
Barrera, David, et al., "SCION Five Years Later: Revisiting Scalability, Control, and Isolation on Next-Generation Networks," arXiv:1508.01651v1 [cs.NI], Aug. 7, 2015; 21 pages.
Dabirmoghaddam, Ali, et al., "Characterizing Interest Aggregation in Content-Centric Networks," arXIV:1603.07995v1 [cs.NI], Mar. 25, 2016; 9 pages.
Deering, S., et al., "Internet Protocol, Version 6 (IPv6) Specification," Network Working Group RFC 2460, Dec. 1998; 39 pages.
Fenner, B., et al. "Protocol Independent Multicast—Sparse Mode (PIM-SM): Protocol Specification (Revised)," Network RFC 4601, Aug. 2006; 112 pages.
Ford, A., et al., "TCP Extensions for Multipath Operation with Multiple Addresses," Internet Engineering Task Force (IETF), RFC 6824, Jan. 2013, 65 pages; https://www.rfc-editor.org/rfc/pdfrfc/rfc6824.txt.pdf.
Gallo, M., et al., "Content-Centric Networking Packet Header Format," IETF Internet-Draft draft-ccn-packet-header-00, Jan. 26, 2015; 16 pages.
Ghali, Cesar, et al., "Living in a PIT-LESS World: A Case Against Stateful Forwarding in Content-Centric Networking," arXIV:1512.07755v1 [cs.NI], Dec. 24, 2015; 10 pages.
Jacobson, Van, "Introduction to Content Centric Networking," FISS 09, Bremen, Germany, Jun. 22, 2009; 96 pages.
Jokela, P., et al., "LIPSIN: Line Speed Publish/Subscribe Inter-Networking," SIGCOMM, Aug. 17-21, 2009, 12 pages; OL-23587-01http://www.cse.tkk.fi/fi/opinnot/T-110.6120/2012_Autumn_Future_Internet/luennot-files/10-lipsin.pdf.
Jokela, Petri, et al., "LIPSIN: Line Speed Publish/Subscribe Inter-Networking," SIGCOMM'09, Aug. 17-21, 2009, Barcelona, Spain; 12 pages.
Mastorakis, S., "ICN Ping Protocol," ICNRG, Internet-Draft, Aug. 26, 2016, 14 pages; https://tools.ietf.org/pdf/draft-mastorakis-icnrg-icnping-00.pdf.
Perino, Diego, "A Reality Check for Content Centric Networking," ICN '11, Aug. 19, 2011, Toronto, Canada, 6 pages.
Pfister, P., et al., "An IPv6 based BIER Encapsulation and Encoding," Network Working Group Internet-Draft draft-pfister-bier-over-IPv6-01, Oct. 31, 2016; 6 pages.
Pigeon, S., "Pairing Function," MathWorld—A Wolfram Web Resource, Sep. 27, 2016, 2 pages; http://mathworld.wolfram.com/PairingFunction.html.
Rosen, E., et al., "MPLS Label Stack Encoding," Network Working Group RFC 3032, Jan. 2001; 23 pages.
So, Won, et al., "Named Data Networking on a Route: Fast and DoS-resistant Forwarding with Hash Tables.," ANCS '13 Proceedings of the ninth ACM/IEEE symposium on Architectures for networking and communications systems, San Jose, CA, Oct. 21-22, 2013; 11 pages.
Szudzik, M., "An elegant pairing function," InNKS2006 Conference, 2006, 12 pages; http://www.szudzik.com/ElegantPairing.pdf.
Thaler, D., et al., "Multipath Issues in Unicast and Multicast Next-Hop Selection," Network Working Group, RFC 2991, Nov. 2000, 10 pages; https://tools.ietf.org/pdf/rfc2991.pdf.
Trotter, G., "Terminology for Forwarding Information Base (FIB) based Router Performance," Network Working Group RFC 3222, Dec. 2001; 15 pages.
Tsilopoulos, Christos, et al., "Reducing Forwarding State in Content-Centric Networks with Semi-Stateless Forwarding," Proceedings of the IEEE Infocom 2014, 20 pages.
Vahlenkamp, M., et al., "Enabling Information-Centric Networking in IP Networks Using SDN," Future Networks and Services, IEEE, Nov. 2013, 12 pages; https://eclass.uoa.gr/modules/document/file.php/DI379/papers-team10/06702539-ICNoverSDN.pdf.
White, Greg, et al., "Strategy & Innovation: Content Delivery with Contnt-Centric Networking," Cable Television Laboratories, Inc., Feb. 2016; 26 pages.
Wijnands, IJ, et al., "Encapsulation for Bit Index Explicit Replication in MPLS and non-MPLS Networks," IETF Internet-Draft draft-ietf-bier-mpls-encapsulation-06, Dec. 9, 2016; 20 pages.
Wijnands, IJ, et al., "Multicast using Bit Index Explicit Replication," IETF Internet-Draft draft-ietf-bier-architecture-05, Oct. 28, 2016; 36 pages.
You, W., et al., "Dipit: A Distributed Bloom-Filter Based Pit Table for CCN Nodes," Computer Communications and Networks (ICCCN), Jul. 2012, 7 pages; https://www.researchgate.net/profile/Gwendal_Simon/publication/261121661_DiPIT_a_distributed_bloom-filter_based_PIT_table_for_CCN_nodes/links/54d8aaf30cf2970e4e785a52/DiPIT-a-distributed-bloom-filter-based-PIT-table-for-CCN-nodes.pdf.

* cited by examiner

INTEREST MESSAGE PATH STEERING AND MULTI-PATH TRACEROUTE IN INFORMATION-CENTRIC NETWORKING

RELATED APPLICATIONS

This application claims the benefit of priority under 35 U.S.C. § 119(e) to U.S. Provisional Application Ser. No. 62/393,823, entitled "INTEREST MESSAGE PATH STEERING AND MULTI-PATH TRACEROUTE IN INFORMATION-CENTRIC NETWORKING," filed Sep. 13, 2016, the disclosure of which is considered part of and is incorporated herein by reference in its entirety.

TECHNICAL FIELD

This disclosure relates in general to the field of communications and, more particularly, to methods and systems for path steering and multi-path traceroutes in information-centric or content-centric networks.

BACKGROUND

Information-Centric Networking (ICN), also referred to as Content-Centric Networking (CCN) or Named Data Networking (NDN), subsequently generically only referred to as ICN, is a new network architecture that has several notable differences from conventional Internet Protocol (IP) networks in that the Internet users now care more about which content or information they are interested in than where the information is located. ICN communication is inherently multi-path and potentially multi-destination. Each networking process (routing, forwarding, content discovery and data retrieval) is based on content name. ICN contains two types of packets: Interest packets for sending requests and Data packets for replying to the request with matching content. Each Interest packet carries a ContentName (ICN name), which expresses what the client wants. Each Data packet carries also a ContentName, which is used to describe the content in this Data and to match the Interest.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
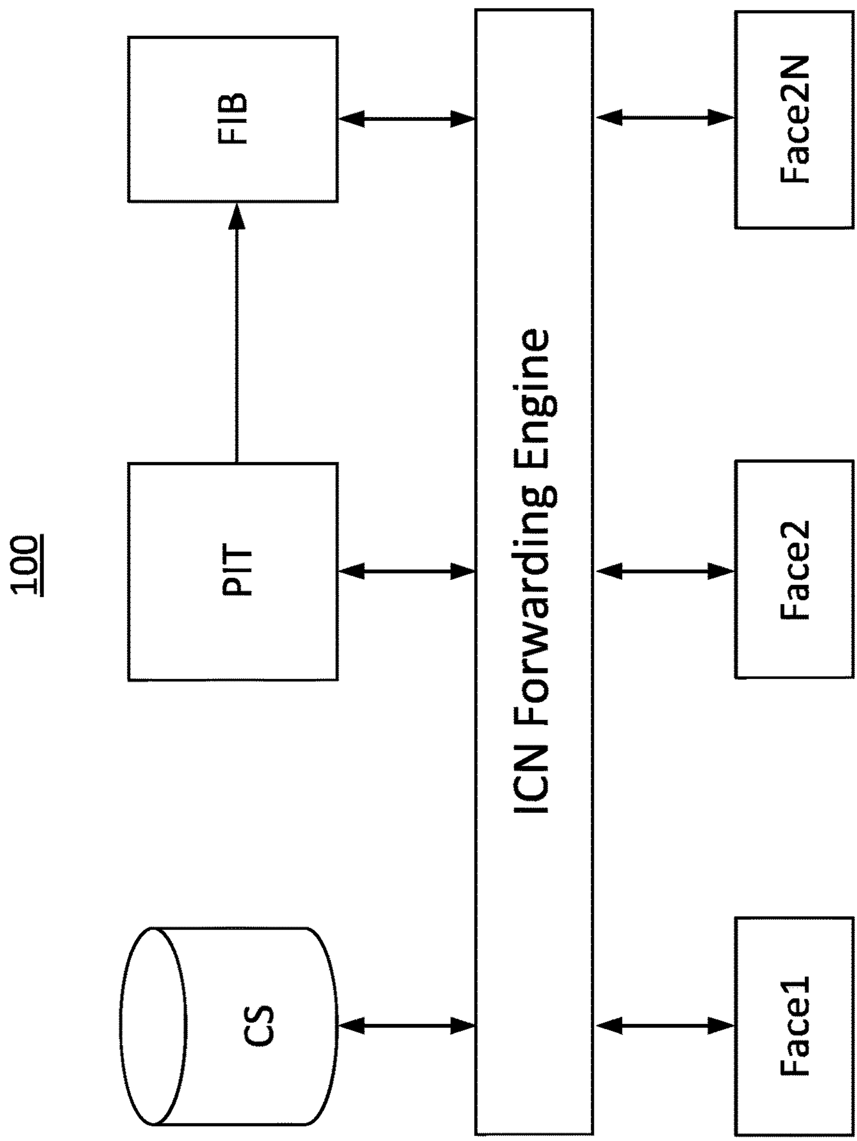
FIG. 1 is a simplified schematic diagram illustrating an exemplary ICN node, according to some embodiments of the present disclosure.

ICN communication is inherently multi-path (multiple paths to a single destination) and potentially also multi-destination (multiple paths to multiple destinations).

Finding ways to take advantage of ICN's multi-path capabilities, including how to couple multi-path routing/forwarding with associated objectives, remains challenging. One example network objective includes the ability to discover, monitor and troubleshoot multi-path network connectivity based on names and name prefixes, as well as to cause multiple packets to follow the same path. Another example objective includes enabling congestion control or load balancing.

One approach to this ICN challenge is to try to make multi-path entirely the responsibility of the routers, with no role for the endpoint requestor. Network-only approaches (either by using virtual-circuit style forwarding or by keeping local state about prior packet transmissions for properly allocating new packets to paths) are known to be complicated, not to scale well, and not to give consumers enough information to accurately control their rate of transmission.

The present disclosure attempts to improve steering of Interest messages and returned data messages and to discover network paths in multipath ICN networks.

Various embodiments of the present disclosure relate to ICN Path Steering. The basic idea is to encode node face identifiers of ICN forwarders (or nodes) in an ICN network traversed by a message between a source and a destination in form of a Path Steering Value (PSV) and to recover the node face identifiers by decoding the PSV. The present disclosure also relates to an ICN Multi-Path Traceroute Tool to discover all paths for a given name/prefix using a Path Steering Value (PSV).

According to one aspect of the present disclosure, a method for path routing in a node fabric of an information-centric network (ICN) includes transmitting a request from a source application to an upstream node via node faces of nodes in the node fabric along a path encoded in a Path Steering Value (PSV); and receiving at the source application from the upstream node a reply that travels along a return path encoded in the PSV. The PSV is generated by pairwise encoding pairs of node faces or of identifiers (ID's) of node faces successively traversed by the reply and is represented by a deterministically decodable pairing function. The node faces or the identifiers can be deterministically, i.e., uniquely, decoded from the PSV.

In an embodiment, when no valid PSV is available, for example when a previously traversed node face becomes unavailable, the node faces via which the request travels from the source application to the upstream node may be assigned by a Forwarding Information Base (FIB).

In another embodiment, a PSV may be decoded, i.e., the node face ID's may be extracted from the PSV, when a message or request travels upstream from the source to the destination. In another embodiment, the PSV may be updated by pairing the most recently traversed node face ID with the previous traversed node face ID's when a content or return message travels downstream from the destination to the source.

In yet another embodiment, the deterministically decodable pairing function may be selected from a Cantor function, a Hoperoft and Ullman variant of the Cantor function and a bitwise pairing function. The deterministically decodable pairing function may also be selected from Morton or Hilbert curves.

In yet another embodiment, the source application may by a requestor sending along an interest path an interest message requesting content data based on a name in the interest message, with one of the upstream node containing the content data; and the reply may be a content message with the requested content data transmitted downstream to the requestor along with the PSV. The requestor may then send a second interest message along the interest path corresponding to the return path previously encoded in the PSV.

In yet another embodiment, the source may be an ICN Treetrace application and the request may be a multi-path traceroute request (MTRQ) message containing a name prefix and the reply may be a multi-path traceroute reply (MTRP) message. In this case, a MTRQ with the name prefix and a previously encoded PSV may be sent to the upstream node, and a MTRP may be returned with a node face ID of the upstream node that connects the upstream node to a next upstream node according to a Forwarding Information Base (FIB). The node face ID in the returned MTRP and the previously encoded PSV are then paired as a new PSV, and another MTRQ may be sent to the next upstream node along a network path defined by the new PSV. Thereafter, another MTRP may be received by the ICN Treetrace application to thereby iteratively discover network paths for the name prefix in the MTRQ's that are uniquely associated with the PSV's.

In yet another embodiment, each MTRQ may include a hop limit indicating a maximum number of node faces to be traversed before the MTRP is returned to the ICN Treetrace application In another aspect of the present disclosure, an apparatus is proposed that is operable to carry out the aforedescribed method, as well as a computer readable medium storing program instructions that cause a computer to execute the aforedescribed method for path routing in a node fabric of an information-centric network (ICN).

In yet another aspect, the present disclosure relates to a system having means for transmitting in an information-centric network (ICN) a request to an upstream node, and means for receiving from the upstream node a reply with a Path Steering Value (PSV) represented by a deterministically decodable pairing function. The means for encoding pair node face identifiers of traversed nodes in the ICN and the means for decoding un-pair the PSV to retrieve the node face identifiers.

As will be appreciated by one skilled in the art, aspects of the present disclosure, in particular the functionality related to various aspects of dynamic partitioning of ICN path steering and Treetrace application may be controlled by computer programs. Accordingly, other aspects of the present disclosure relate to systems, computer programs, mechanisms, and means for carrying out the methods according to various embodiments described herein. Such systems, computer programs, mechanisms, and means could be included within various network devices, such as e.g. the nodes, routers and forwarders. A computer program may, for example, be downloaded (updated) to the existing network devices and systems (e.g. to the existing routers, switches, various control nodes, etc.) or be stored upon manufacturing of these devices and systems.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be easily learned by the practice of the principles set forth herein.

Example Embodiments

Overview of Interest Steering in ICN Networks

FIG. 1 illustrates by way of example the architecture of an ICN node 100, which is composed of essentially three elements, namely a Forwarding Information Base (FIB) that is used to forward the Interests to the sources that are known to potentially hold the matching content, a Pending Interest Table (PIT) that stores all the Interests that a router has forwarded but for which it has not yet received matching Data packets, and a Content Store (CS) representing a cache or a buffer that stores recently forwarded content Data packets. A Face refers to a logical interface representing a network interface capable of sending and receiving ICN packets to the adjacent ICN node, for example via Ethernet, Internet Protocol (IP), User Datagram Protocol (UDP), Transmission Control Protocol (TCP), Multi-Protocol Label Switching (MPLS), and other transmission protocols.

An ICN node will hereinafter also be referred to as an ICN Forwarder, and these two terms may and will be used interchangeably. In the context of the present disclosure, "upstream" generally refers to transmission from the consumer 202 to the data producer 204, while "downstream" generally refers to transmission from the data producer 204 to the consumer 202. This designation applies, mutatis mutandis, also to FIGS. 3 and 4.

When an Interest packet arrives at an ICN face (Face1, Face2, . . . FaceN), an ICN Forwarder passes it to the Content Store CS in order to find a match. If the Content Store CS contains Data matching the Interest, the Data will be directly returned via the same face at which the Interest arrived. If no matching Data are found in the Content Store CS, the Content-Name is further checked in the Pending Interest Table PIT. If the Pending Interest Table contains a matching entry, the incoming Interest is aggregated with the existing entry and is not forwarded further. If the Pending Interest Table does not contain a matching entry, the Forwarding Information Base is consulted for the forwarding information, a new entry associated with the new arrival Interest is created in the Pending Interest Table, and the Interest is forwarded upstream.

As a consequence of ICN's stateful forwarding, the Interest's upstream path and the corresponding Data message's downstream path are symmetric (i.e., the Data message sent in response to an Interest simply follows the reverse path of the Interest, using the state saved at each hop when the Interest was processed).

In regards to packet forwarding, subsequent FIB lookups of the same Interest name in the ICN forwarder may result in Interest message being forwarded over different interfaces, because the ICN Forwarder can choose from the returned list of available interfaces. This makes it difficult to direct packet traffic, i.e., forward packets in ICN environments onto a specific network path. Conversely, IP forwarding forwards packets over the same interface in the absence of changes in the control/routing plane.

Figure 2:
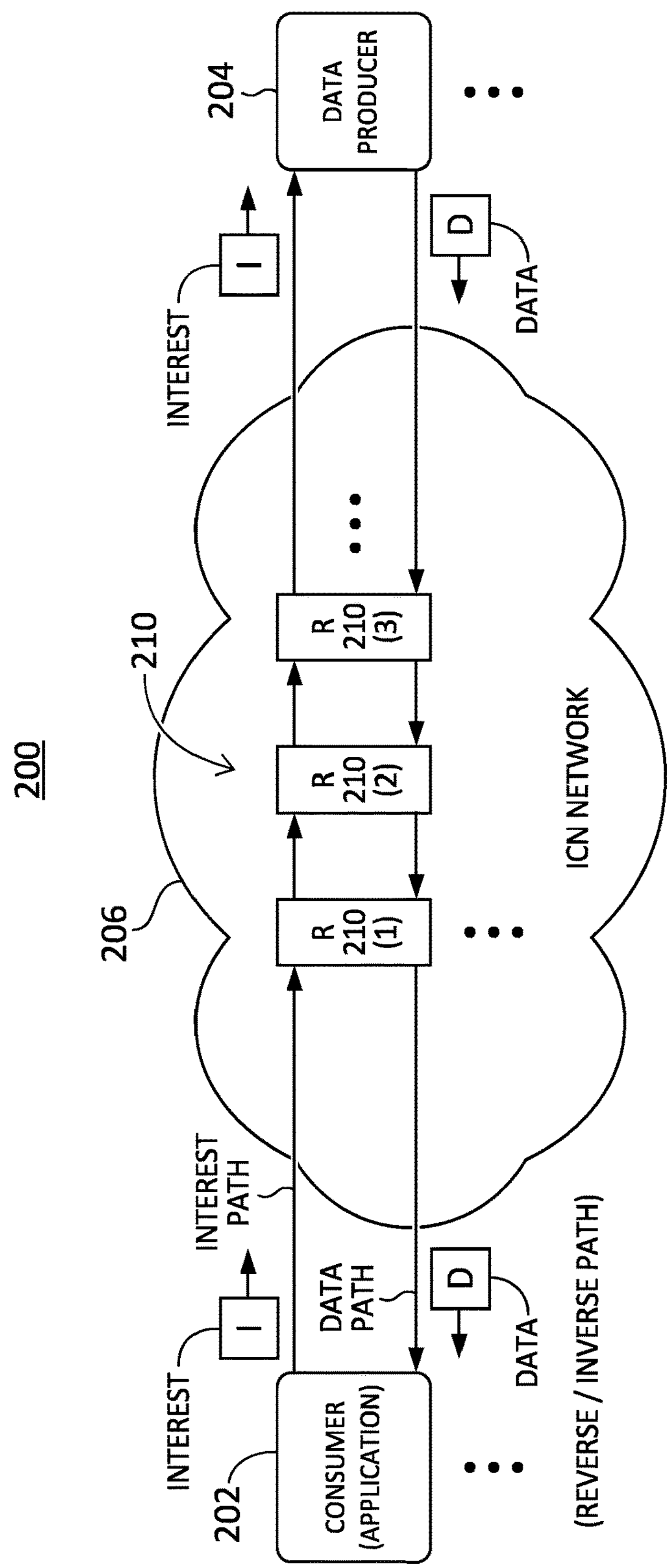
FIG. 2 is a simplified schematic diagram illustrating an exemplary ICN environment, according to some embodiments of the present disclosure.

FIG. 2 shows schematically an exemplary ICN network environment 200 in which embodiments of the present disclosure related to ICN Path Steering and ICN Multi-Path Traceroute can be implemented. The depicted ICN environment 200 includes at least one requestor (or consumer)

application 202 (hereinafter referred to simply as "requestor" 202) requesting data, at least one data producer (content store, CS) 204 storing and producing the data responsive to the requests for data, and an ICN network 206 having a plurality of network nodes 210 (e.g., nodes (210(1), 210(2), and 210(3)) to route the requests for data and the returned data between the requestor 202 and the data producer 204. The network nodes 210 may be for example network routers or switches.

In the ICN environment 200, communication between requestor 202, data producer 204, and nodes 210 may include exchanges of two types of packets or messages: Interest packets (I) representing the request for data and Data packets (D) representing the returned content data. Both types of packets carry a name that identifies a piece of data (i.e., a data object) that can be transmitted in one Data packet. Requestor 202 puts the name of a desired data object into an Interest message and sends the Interest message to the data producer 204 through the ICN network 206 along ICN nodes 210 defining an Interest path or forwarding path based on the name of the desired data object. Path segments between adjacent nodes 210(1)-210(2), 210(2)-210(3), etc. may be referred to as "path links" or simply as "links."

ICN networks may benefit from a path steering mechanism wherein path information is made available to endpoints. In particular, given that ICN is receiver-driven and that a Data message with the requested content simply follows the reverse path of the corresponding Interest, a) exposing the path information to the requestor endpoint may be the most important, and b) endpoint steering may be achieved by having the endpoint steer Interests (which may also serve, indirectly, to steer the Data messages). Furthermore, ICN networks may benefit from an endpoint ICN multi-path traceroute tool that is capable of exploring multiple available paths in ICN network for a specific name prefix, and that such a tool would need path information.

In the following sections, a proposed design of a path steering mechanism will be described first, followed by a description of the design of an ICN multi-path traceroute tool.

Path Steering Mechanism

According to some embodiments of the disclosure, a returned ICN Content message may carry a Path Steering Value (PSV) that is modified by every intermediate ICN forwarder such that its final value (i.e., when the returned Content Message arrives at the requestor) identifies the unique path the Content message took to reach the requestor.

Due to the symmetry of forward and reverse paths in ICN network, subsequent Interest message from the requestor may include the PSV value to specify the path that the subsequent Interest message is to traverse in order to fetch the same or similar (e.g. next chunk) Content message. An expression "deterministically decodable pairing function" or "identifying a unique path" is used to describe that the PSV in an Interest message dictates to each intermediate ICN forwarder unambiguously which outgoing face to use for forwarding the Interest message.

According to some embodiments of the disclosure, the PSV is a single unique numerical value that is mutated at every hop, i.e., each time an Interest message or a Content message traverse a node face of a particular ICN forwarder or node. The single numerical value is generated by a mathematical algorithm that can be readily implemented with low overhead in the data forwarding mechanism of an ICN forwarder. According to some embodiments of the disclosure, the proposed mathematical algorithm is based on a pairing function P that allows two natural numbers to be uniquely encoded into a single natural number P(x1, x2)=y. An inverse pairing function denoted hereinafter as !P must also exist that allows an unambiguous and deterministic recovery of both values (x1, x2) from a single natural number !P(y)=[x1, x2]. The proposed pairing function can be generalized to an arbitrary number of N numbers $\{x_1, \ldots, x_N\}$ that can be encoded into a single numerical value in such a manner that numbers $\{x_1, \ldots, x_N\}$ can be deterministically recovered afterwards from the single numerical value alone.

The salient feature of the proposed pairing function is its deterministic reversibility. One exemplary attempt to enable ICN path steering employed a Bloom filter constructed of the node+link identifier chosen at each split point. The requestor hereby includes this Bloom filter in future Interests for the corresponding path. At split points, the forwarder looks up, in the received Bloom Filter, the node+link for each next-hop in the FIB entry. A hit indicates which next-hop should be used. This approach has two potential disadvantages. First, Bloom Filters are probabilistically incorrect and may produce false positives, meaning that a node+link may be reported as being a member of the Bloom Filter set although in actuality it is not. Second, the identifiers in the Bloom Filter must be network-wide unique since the lookup can find any member of the Bloom Filter set. Network-wide unique identifiers increase the cost of this approach.

Useful examples of deterministically reversible pairing functions exist, for example Cantor pairing functions and its variants, bitwise pairing functions, Morton encoding/decoding, Hilbert curves, etc., that can be readily applied to ICN path steering. As an example, a Cantor pairing function is a theoretically proven pairing function, which involves only a few arithmetic operations (multiplication, division and three additions) in order to encode (pair) and a few different arithmetic operations (square root, multiplication, division, addition and subtraction) in order to decode (unpair). To pair more than two numbers, pairings of pairings can be used.

Example of Interest Steering Along a Path

Figure 3:
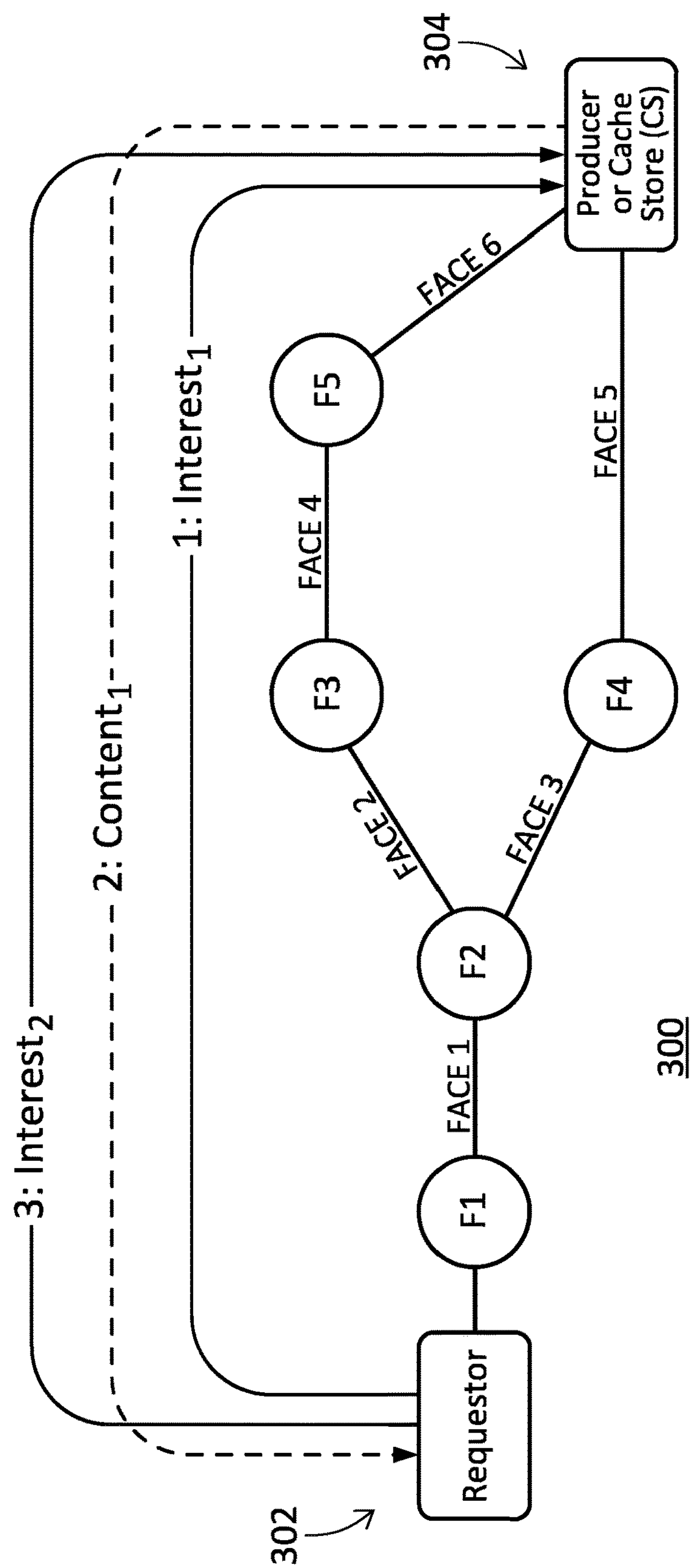
FIG. 3 is a simplified schematic diagram illustrating end-to-end Interest steering by an ICN requestor, according to some embodiments of the present disclosure.

End-to-end Interest steering by an ICN consumer or requestor of either an Interest or a Content message in the exemplary ICN environment 200 (FIG. 2) with a Path Steering Value PSV will now be described with reference to the steps 1 to 3 listed below and illustrated in FIG. 3, showing an exemplary ICN Interest steering environment 300.

In the following examples, encoding number pairs as an integer path steering value (PSV) will be denoted with the symbol "P" preceding the number pair, while decoding the path steering value (PSV) into number pairs will be denoted with the symbol "!P" preceding the PSV. The numbers x1, x2, . . . xN are representative of the face IDs of ICN forwarders. For example:

P(x1, x2)=y1

P(P(x1, x2), x3)=P(y1, x3)=y2,

[x1, x2, x3] may be recovered (decoded) from y2 as follows:

!P(y2)=[y1, x3]

!P(y1)=[x1, x2]

Requestor 302 in FIG. 3 is connected to node/forwarder F1 and sends an Interest message $\text{Interest}_1$, wherein the name of the Interest message $\text{Interest}_1$ contains the name of the desired content (for example/cisco/Cannbridge/file1/0). The initial value of the Path Steering Value PSV=0 or the PSV TLV (TLV=type-length value) is missing from the Interest message $\text{Interest}_1$. In this example, it will be assumed that the desired content is not in the cache of Forwarder1 (F1), so that the message $\text{Interest}_1$ is forwarded by Forwarder1 (F1) via Face1 to the next node, in this case to Forwarder2 (F2). Once more assuming that the desired content is not in the cache of Forwarder2, the message $Interest_1$ is forwarded by Forwarder2 (F2) via Face to Forwarder3 (F3), and from there on via Face4 to Forwarder5 (F5) and via Face6 to a node 304 (producer or cache, referred to as content store CS in FIG. 1) where the desired content is found, using the normal FIB based forwarding process. The Content message $Content_1$ matching the Interest message $Interest_1$ is forwarded downstream towards the ICN requestor on the reverse path.

Following the reverse path, Forwarder5 (F5) receives the desired Content message $Content_1$, initializes PSV=P(Face6, 0) and forwards the Content message $Content_1$ downstream using the normal PIT-based matching. The number "0" is used in the initial pairing function on the return path from Producer 304 to Forwarder F5 merely as an example. The number "0" can be replaced with any globally recognized reserved value indicating that this is not a valid face ID for the Producer 304. Forwarder3 (F3) receives the Content message $Content_1$ with PSV=P(Face6, 0) via Face4, overwrites the previous PSV with a new PSV=P(P(Face6, 0), Face4) and forwards the Content message $Content_1$ downstream using the normal PIT-based matching. Forwarder2 (F2) receives the Content message $Content_1$ via Face2 with PSV=P(P(Face6, 0), Face4), overwrites the previous PSV with a new PSV=P(P(P(Face6, 0), Face4), Face2) and forwards the Content message $Content_1$ downstream using the normal PIT-based matching. Forwarder1 (F1) receives the Content message $Content_1$ via Face with PSV=P(P(P(Face6, 0), Face4), Face2), overwrites the previous PSV with a new PSV=P(P(P(P(Face6, 0), Face4), Face2), Face1) and forwards the Content message $Content_1$ downstream toward the requestor 302 using the normal PIT-based matching.

Having received the desired Content message $Content_1$ with PSV=P(P(P(P(Face6, 0), Face4), Face2), Face1), the requestor 302 is now prepared to transmit another (new) Interest message $Interest_2$ to request the next chunk of the file /cisco/Cannbridge/file1/1 which is supposed to take the same path to the producer or cache 304. To do that, the new Interest message, $Interest_2$, includes PSV=P(P(P(P(Face6, 0), Face4), Face2), Face1) and is forwarded to Forwarder1 (F1), like the prior Interest message $Interest_1$.

Forwarder1 (F1) performs normal FIB lookup based on the name of the Interest message, which returns one next-hop ID: Face1. Because PSV TLV is present in the Interest message, Forwarder1 (F1) performs one decoding operation to recover two values from PSV !P(P(P(P(Face6, 0), Face4), Face2), Face1))=[P(P(P(Face6, 0), Face4), Face2), Face1]. Forwarder1 (F1) compares its next-hops to [P(P(P(Face6, 0), Face4), Face2), Face1] and finds a match (Face1). Prior to forwarding the Interest message via Face1, Forwarder1 (F1) overwrites the PSV containing Face1, so that the updated PSV value becomes PSV=P(P(P(Face6, 0), Face4), Face2).

Forwarder2 (F2) performs normal FIB lookup based on the name of the Interest message $Interest_2$ which returns two next-hop IDs: Face2 and Face3. Because PSV TLV is present in the Interest message $Interest_2$, Forwarder2 (F2) performs one decoding operation to recover two values from PSV !P(P(P(Face6, 0), Face4), Face2)=[P(P(Face6, 0), Face4), Face2]. Forwarder2 (F2) compares its next-hops to [P(P(Face6, 0), Face4), Face2] and finds a match (Face2). Prior to forwarding the Interest message $Interest_2$ via Face2, Forwarder2 (F2) overwrites PSV containing Face2, so that the updated PSV value becomes PSV=P(P(Face6, 0), Face4).

Forwarder3 (F3) performs normal FIB lookup based on the name of the Interest message, which returns one next-hop ID: Face4. Because PSV TLV is present in the Interest message $Interest_2$, Forwarder3 (F3) performs one decoding operation to recover two values from PSV ! P(P(Face6, 0), Face4)=[P(Face6, 0), Face4]. Forwarder3 (F3) compares its next-hops to [P(Face6, 0), Face4] and finds a match (Face4). Prior to forwarding the Interest message via Face4, Forwarder3 overwrites PSV containing Face4, so that the updated PSV value becomes PSV=P(Face6, 0).

Forwarder5 (F5) performs normal FIB lookup based on the name of the Interest message $Interest_2$, which returns one next-hop ID: Face6. Because PSV TLV is present in the Interest message $Interest_2$, Forwarder5 (F5) performs one decoding operation to recover two values from PSV ! P(Face6, 0)=[Face6, 0]. Forwarder5 (F5) compares its next-hops to [Face6, 0] and finds a match (Face6). Prior to forwarding the Interest message $Interest_2$ via Face6, Forwarder5 either assigns PSV=0 (i.e., specially recognized value) or removes PSV TLV from the Interest message completely.

The PSV that the consumer learns and then uses to steer an interest may be learned by other mechanisms than described above. For instance, a network path server with knowledge of the current physical topology and each node's FIB (e.g. a component of a network controller) could, given a target destination or destination name, calculate paths to that target and PSVs for those paths. Using some protocol exchange, the path server could communicate the target and one more PSVs to the consumer, possibly also in conjunction with other properties such as the load-balancing percentage across the PSVs.

It should be emphasized here again that in the exemplary ICN environment 300 shown in FIG. 3, the entire path from the requestor 302 to the producer or cache store 304 can be encoded deterministically in form of a single unique numerical value PSV that is mutated at every hop/node or Forwarder (Fi). This unique numerical value represents deterministically, i.e., in one-to-one correspondence, one of the plurality of paths or faces via which the $Interest_1$ can or is traveling upstream from the requestor 302 to the producer or cache store 304, and via which the $Content_1$ is returned downstream from the producer or cache store 304 in the reverse direction toward the requestor 302.

Effect of Routing Changes on Forwarding Steered Interests

Over time, the state of forwarders and nodes may change such that, at some node, a given face is no longer available as a next-hop defined in the returned PSV. In this case, the face that is no longer available will be detected by a failure to find a match between the next-hop defined in the returned PSV and the FIB entry list of next-hops at a particular forwarder. One action at this point is to respond to the Interest with an Interest-Return NACK (negative-acknowledgement) signal sent in many communications protocols to reject a previously received message, or to indicate some kind of error, for example by returning a code "PSV-invalid".

Another action at this point is, instead of simply returning the NACK signal, for the particular forwarder detecting the inconsistency to clear the PSV field and forward the Interest using the forwarder's FIB. If desired, the requestor can keep enough information about outstanding Interests to determine if the PSV sent with the Interest fails to match the PSV in the returned Content.

The check that a next-hop specified by the PSV is a valid face at a forwarder for the prefix ensures that the Interest will always follow a valid path to the producer or cache.

The following example describes a situation where Forwarder2 (F2) is unable to forward the $\text{Interest}_2$ via the previously determined Face2 because a match for Face2 could not be found, thus indicating that Face2 is no longer valid path for a next-hop for the Interest message from Forwarder2 (F2). In this case, the Forwarder2 (F2) performs normal FIB lookup based on the name of the Interest message which returns one next-hop ID: Face3, because Face2 is no longer valid. Because PSV TLV is present in the Interest message, Forwarder2 performs one decoding operation to recover two values from PSV !P(P(P(Face6, 0), Face4), Face2)=[P(P(Face6, 0), Face4), Face2]. Forwarder2 compares its next-hops to [P(P(Face6, 0), Face4), Face2] and finds no match (Face2 not found, because Face2 is no longer valid, i.e., is unavailable).

Forwarder2 (F2) handles this situation by sending an Interest-Return (ACK) with a code of Invalid-PSV. Forwarder1 receives an Interest-Return message with PSV=P (P(P(Face 6, 0), Face4), Face2), overwrites PSV=P(P(P(P (Face6, 0), Face4), Face2), Face1) and forwards it downstream using the normal PIT-based matching.

The requestor receives an Interest-Return message with for example code=PSV-invalid and PSV=P(P(P(P(Face6, 0), Face4), Face2), Face1) and removes the invalid PSV.

A subsequent interest message $\text{Interest}_2$ will then be forwarded, in analogy to Step 1 above, by Forwarder2 (F2) via Face3 to Forwarder4 (F4), and from there on via Face5 to node 304 (producer or cache store) where the desired content is found, using the normal FIB based forwarding process. The corresponding Content message $\text{Content}_2$ (not shown in FIG. 3, but is analogous to $\text{Content}_1$, except for the different node faces and hence PSV)) matching the Interest message $\text{Interest}_2$ is forwarded downstream towards the ICN requestor on the reverse path, i.e., via Face5 of Forwarder 4 (F4) and Face3 of Forwarder2 (F2).

The PSV for the alternate path via Face3 and Face5 are computed in analogy to the PSV for the first path via Face2, Face4 and Face6.

Figure 4:
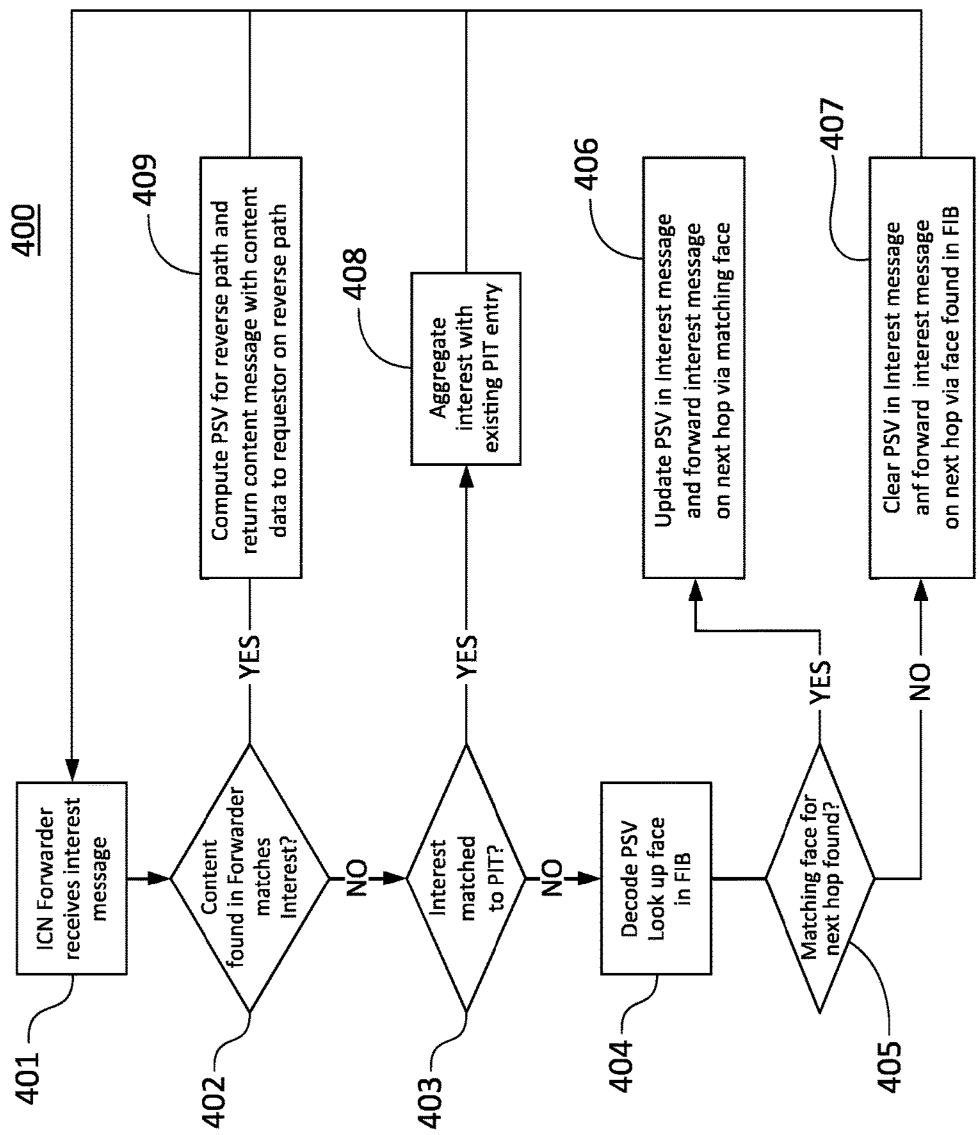
FIG. 4 is a flow chart depicting the process flow for end-to-end Interest steering according to FIG. 3.

The process of ICN path steering described above will now be summarized schematically in form of a flow chart in FIG. 4. The process 400 starts at step 401, with a particular ICN Forwarder, which may be the first ICN Forwarder upstream of the requestor or another ICN Forwarder along the interest path, receiving an interest message, for example from a requestor, requesting content from a content store CS. If content found in the particular ICN Forwarder matches the Interest, i.e. if the particular ICN Forwarder represents the content store CS containing the requested content data, at step 402, then the content data are returned to the requestor on the reverse path and a PSV is computed and encoded for the reverse path, at step 409, with the process 400 then returning to step 401.

If the content is not found in the particular ICN Forwarder, the process 400 goes to step 403, where a Pending Interest Table (PIT) is checked whether it already contains an entry matching the Interest. If a matching PIT entry exists, at step 403, the incoming Interest is aggregated with the existing entry, at step 408, and the process 400 returns to step 401. If no matching PIT entry is found, at step 403, process 400 decodes, at step 404, a previously received PSV and looks up, in a FIB, faces for forwarding the interest message to the next ICN Forwarder. If it is determined at step 405 that a face decoded from the prior PSV matches an entry in the FIB, then the PSV is updated in the interest message which then is forwarded to the next upstream forwarder on the next hop via the matching face, at step 406, and the process 400 returns to step 401. Conversely, if no matching face is found at step 405, the PSV field in the interest message is cleared and the interest message is forwarded on the next hop via a node face found in the FIB, at step 407, with the process 400 thereafter returning to step 401.

The process 400 may also be terminated before the requested content is found in a content store, when a preset time or a preset number of hops for returning content has been exceeded.

Design of ICN Multi-Path Traceroute Using Path Steering

Figure 5:
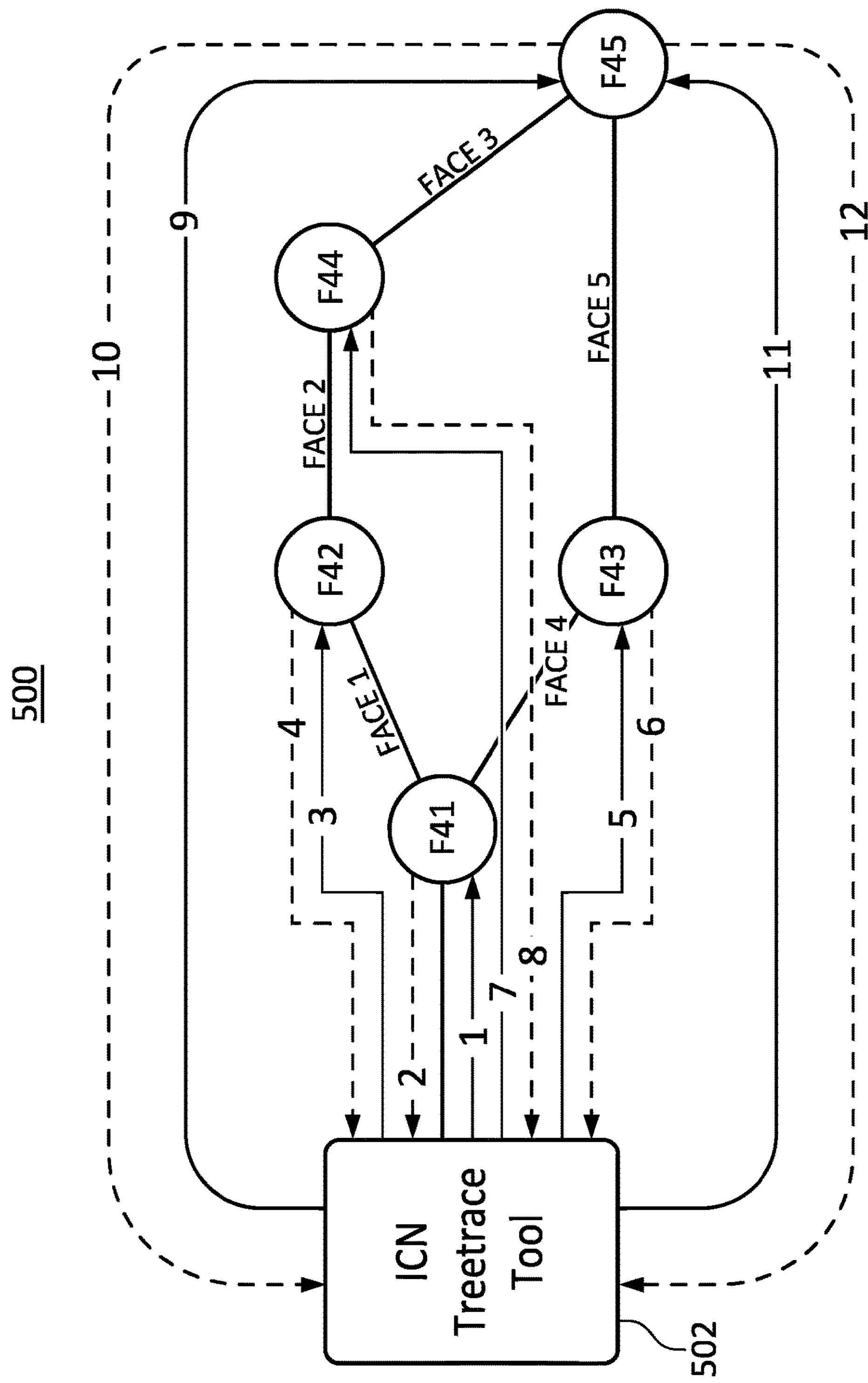
FIG. 5 is a simplified schematic diagram illustrating ICN multi-path traceroute protocol operation, according to some embodiments of the present disclosure.

FIG. 5 is a simplified schematic diagram illustrating ICN multi-path traceroute protocol operation 500, according to some embodiments of the present disclosure. The ICN multi-path traceroute protocol, like the ICN Path Steering Mechanism described above with reference to FIG. 3, uses a Path Steering Value (PSV) for both multi-path traceroute request message (MTRQ) steering and path identification purposes.

In the following description, the odd-numbered full lines labeled 1, 3, . . . 11 in FIG. 5 depict upstream MTRQ messages, whereas the even-numbered dashed lines labeled 2, 4, . . . 12 depict downstream MTRP messages. A MTRQ message is forwarded similarly to the aforedescribed Interest message, a MTRP message is returned similarly to the aforedescribed Content message. An ICN forwarder (F41, F42, . . . . F45) replies with a MTRP message in either of the following cases: a) HopLimit TLV=0 (after decrement at the respective Forwarder) or b) PSV TLV=0 (or any other specially recognized value), or c) missing PSV TLV. The field HopLimit specifies a limit on the number of hops a packet is allowed before being discarded. Forwarders modify packets as they are forwarded by updating the PSV and decrementing the respective hop limit fields. Forwarders do not forward packets with a resultant HopLimit field of 0 or less.

The ICN treetrace tool 502 depicted in FIG. 5 sends to Forwarder41 (F41) a first MTRQ request message labeled "1" containing the prefix to be diagnosed (e.g. /cisco/Cambridge) and a random nonce (e.g. /57485). The ICN traceroute application starts its operation by sending this first MTRQ request message with HopLimit=1 and PSV=0 (i.e., a specially recognized value) or a missing PSV TLV.

Forwarder41 (F41) performs the normal FIB lookup based on the prefix in the MTRQ message (e.g. /cisco/cambridge/57485), which returns to the ICN treetrace tool 502 the ID's of two possible next-hops: Face1 and Face4 in FIG. 5. Since the Interest HopLimit has been decremented by Forwarder41 (F41) to HopLimit=0, Forwarder41 (F41) replies with a MTRP reply message labeled "2" carrying Multi-Path Information (MPINF) TLV containing Face1 and Face4 in the uncombined form (e.g. separate sub-TLVs) and PSV=0.

When exploring the first possible path to Forwarder42 (F42) via Face1, the ICN treetrace tool 502 receives the MTRP reply message containing Face1 and Face4 identifiers and subsequently transmits a new MTRQ message labeled "3" with PSV=P(0, Face1) and HopLimit=2. Forwarder41 (F41) performs normal FIB lookup based on the prefix in the MTRQ message labeled "3", which returns two next-hop IDs: Face1 and Face4. Because PSV TLV is present in the MTRQ message, Forwarder41 (F41) performs one decoding operation to recover two values from PSV !P(P(0, Face1))=[0, Face1]. Forwarder41 (F41) compares its next-hops to [0, Face1] and finds a match (Face1). Prior to forwarding the MTRQ message via Face1, Forwarder41 (F41) overwrites PSV with PSV=0.

Forwarder42 (F42) performs normal FIB lookup based on the prefix in the MTRQ message, which returns one next-hop ID: Face2. Since the Interest HopLimit=0, Forwarder42 (F42) replies with a MTRP message labeled "4" carrying MPINF TLV=Face2 and PSV=0. As the MTRP message is forwarded downstream towards the ICN treetrace tool 502, its PSV is modified as described herein in the previous section "Path Steering Mechanism." MPINF TLV is not modified on per-hop basis.

The ICN treetrace tool 502 receives the MTRP message containing Face1 identifier and transmits a new MTRQ message labeled "7" with PSV=P(Face1, P(0, Face2)) and HopLimit=3 (assuming Depth First Search path exploration approach). One approach to PSV value generation in the treetrace tool 502 is to start pairing FaceIDs starting with the most recently received values from the MPINF TLV. This results in a Depth First Search path exploration pattern. Forwarder41 (F41) performs normal FIB lookup based on the prefix in the MTRQ message which returns two next-hop IDs: Face1 and Face4. Because PSV TLV is present in the MTRQ message, Forwarder41 (F41) performs one decoding operation to recover two values from PSV !P(P(Face1, P(0, Face2)))=[Face1, P(0, Face2)]. Forwarder41 (F41) compares its next-hops to [Face1, P(0, Face2)] and finds a match (Face1). Prior to forwarding the MTRQ message via Face1, Forwarder41 (F41) overwrites the previous PSV with PSV=P(0, Face2). Forwarder42 (F42) performs normal FIB lookup based on the prefix in the MTRQ message, which returns one next-hop ID: Face2. Because PSV TLV is present in the MTRQ message, Forwarder42 (F42) performs one decoding operation to recover two values from PSV !P(P(0, Face2 ))=[0, Face2]. Forwarder42 (F42) compares its next-hops to [0, Face2] and finds a match (Face2). Prior to forwarding the MTRQ message via Face2, Forwarder42 (F42) overwrites the previous PSV with PSV=0.

Forwarder 44 (F44) performs normal FIB lookup based on the prefix in the MTRQ message, which returns one next-hop ID: Face3. Since at this point the Interest HopLimit=0, Forwarder44 (F44) replies with MTRP message labeled "8" carrying MPINF TLV=Face3 and PSV=0. As the MTRP message is forwarded downstream towards the ICN treetrace tool 502, its PSV is modified as described herein previously in the section "Path Steering Mechanism." MPINF TLV is not modified on per-hop basis.

The ICN treetrace tool 502 receives MTRP message containing Face3 identifier and transmits a new MTRQ message labeled "9" with PSV=P(Face , P(Face2, P(0, Face3))) and HopLimit=4 to continue the exploration of the path, which may be carried out analogously to the previous steps by returning MTRP message labeled "10" downstream towards the ICN treetrace tool 502.

Exploring Second Possible Path Via F43 (Face4)

When a traceroute application using ICN treetrace tool 502 has completed the exploration of the exemplary path via F41, F42, F44 and F45, it can continue exploring other thus far unexplored paths, such as the path via Face 4 of F41. In the present example, the ICN treetrace tool 502 transmits a new MTRQ message labeled "5" with PSV=P(0, Face4) and HopLimit=2. Forwarder41 (F41) performs normal FIB lookup based on the prefix in the MTRQ message which returns two next-hop IDs: Face1 and Face4. Because PSV=P(0, Face1) has previously been explored and PSV TLV is present in the MTRQ message, Forwarder41 (F41) performs one decoding operation to recover two values from PSV !P(P(0, Face4))=[0, Face4]. Forwarder41 (F41) compares its next-hops to [0, Face4] and finds a match (Face4). Prior to forwarding the MTRQ message via Face4, Forwarder41 (F41) overwrites PSV with PSV=0.

Forwarder43 performs normal FIB lookup based on the prefix in the MTRQ message labeled "5", which returns one next-hop ID: Face5. Since the Interest HopLimit=0, Forwarder43 (F43) replies with MTRP message labeled "6" carrying MPINF TLV=Face5 and PSV=0. As the MTRP message labeled "6" is forwarded downstream towards the ICN treetrace tool 502, its PSV is modified as described herein previously in the section "Path Steering Mechanism."

The traceroute application receives MTRP message containing Face5 identifier and transmits a new MTRQ message labeled "11" with PSV=P(Face4, P(0, Face5)) and HopLimit=3 to continue the exploration of the path, which may be carried out analogously to the previous steps by returning a MTRP message labeled "12" downstream towards the ICN treetrace tool 502.

Figure 6:
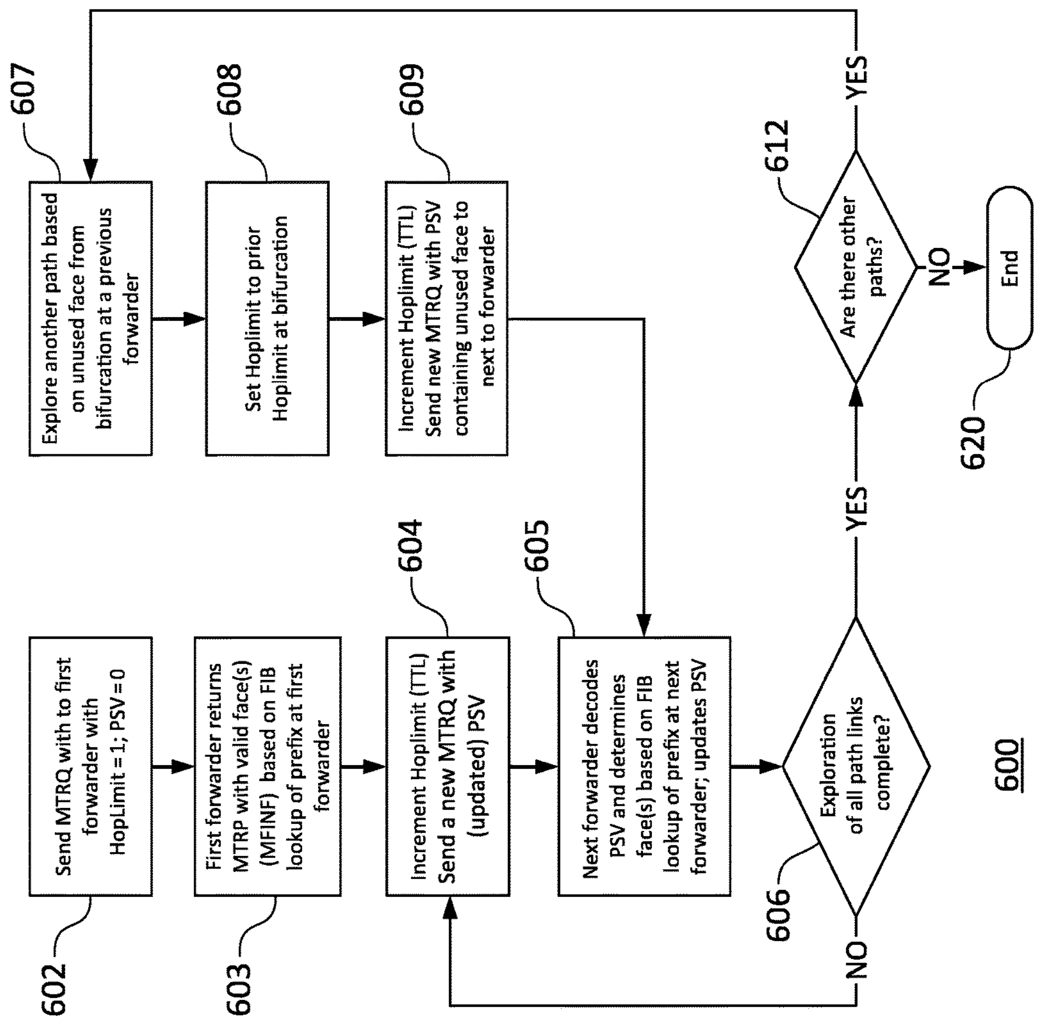
FIG. 6 is a flow chart depicting the process flow for ICN multi-path traceroute protocol operation according to FIG. 5.

The process of ICN multi-path traceroute application described above will now be summarized schematically in form of a flow chart in FIG. 6. The process 600 starts at step 602 by sending from an ICN treetrace tool to a first downstream node a multi-path traceroute request (MTRQ) message with a prefix for which a path is to be diagnosed. The MTRQ message, has, for example, a hop limit=1 or an equivalent TTL value and PSV=0. At step 603, the first node returns a multi-path traceroute reply message (MTRP) with one or more valid faces based on FIB lookup of the prefix at the first node.

A new MTRQ with a hop limit incremented by 1 and a new (updated) PSV based on the valid face(s) is then sent to the next downstream node on the already explored path, at step 604. At step 605, the next downstream node decodes the PSV and determines the next valid face(s) based on FIB lookup of prefix at next node and updates the PSV with the next valid face. If the exploration of the path links along the path is not yet complete, i.e., if the desired prefix has not yet been found, at step 606, the process 600 goes back to step 604 and increases the hop limit by 1 to proceed on the already explored path to the next not yet accessed downstream node. Conversely, if the exploration of all path links along the particular path is complete, but not all paths have been explored, at step 612, the process goes to step 607 and explores another path, with the hop limit set to the previous number of hops where the process 600 branched (for example bifurcation at F41), at step 608. The process 600 thereafter performs step 609, which is substantially identical to step 604, and then goes to step 605 to construct the MTRP for that path. When all available paths have been explored, the process 600 terminates at step 620.

The ICN multi-path traceroute application is responsible for supplying the correctly (deterministically) constructed PSV with the list of available next-hops, with the task of keeping track of the discovered paths and the correct construction of the PSVs being performed by the ICN multi-path traceroute application.

Figure 7:
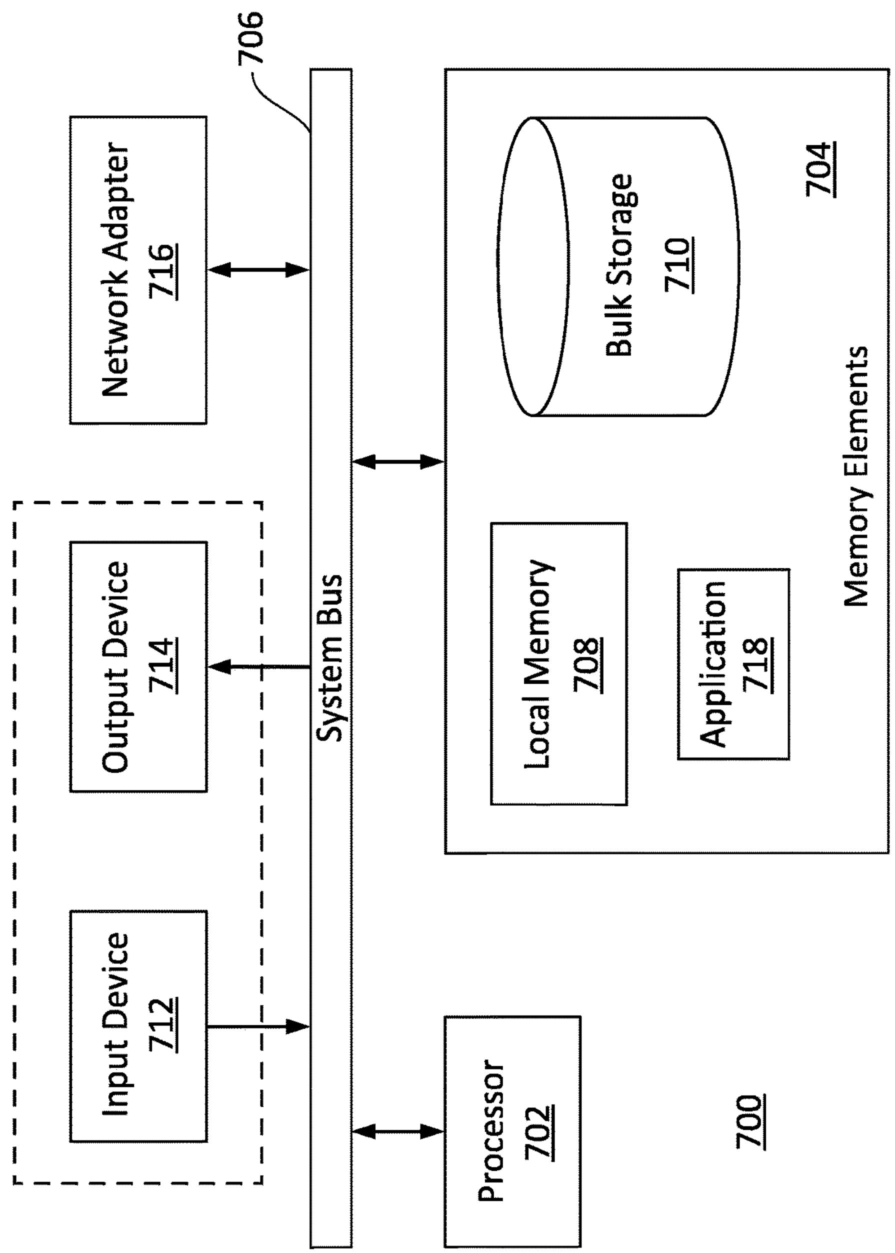
FIG. 7 depicts a block diagram illustrating an exemplary data processing system that may be used to implement ICN Path Steering and ICN Multi-Path Traceroute, according to some embodiments of the present disclosure.

FIG. 7 depicts a block diagram illustrating an exemplary data processing system that may be used to implement ICN Path Steering and ICN Multi-Path Traceroute, according to some embodiments of the present disclosure.

As shown in FIG. 7, the data processing system 700 may include at least one processor 702 coupled to memory elements 704 through a system bus 706. As such, the data processing system may store program code or an application 718 in memory elements 704 such as a local memory 708 and/or a bulk storage device 710. Further, the processor 702 may execute the program code accessed from the memory elements 704 via the system bus 706. In one aspect, the data processing system may be implemented as a computer that is suitable for storing and/or executing program code. The processing system 700 may also include one or more cache memories (not shown) that provide temporary storage of at least some program code in order to reduce the number of times program code must be retrieved from the bulk storage device 710 during execution.

The data processing system 700 may also include input/output (I/O) devices 712, 714. Moreover, a network adapter 716 may also be coupled to the data processing system for connection to other unillustrated systems, such as for example computer systems, remote network devices, and/or remote storage devices through intervening private or public networks.

In one aspect, the data processing system 700 may represent a server. For example, the data processing system may represent a router or forwarder, in which case the application 718, when executed, may configure the data processing system to perform ICN path steering and traceroute operations.

Persons skilled in the art will recognize that while the elements 702-718 are shown in FIG. 7 as separate elements, in other embodiments their functionality could be implemented in lesser number of individual elements or distributed over a larger number of components.

As used herein, the term "packet" (which may be used interchangeably with the term "message") refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith.

In certain example implementations, functions related to ICN Path Steering and ICN Multi-Path Traceroute outlined herein may be implemented by executing program logic stored in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.).

It should be noted that the steps of methods/algorithms described herein illustrate only some of the possible scenarios that may be executed by, or within, an ICN environment to implement ICN Path Steering and ICN Multi-Path Traceroute described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method for path routing in a node fabric of an information-centric network (ICN), the method comprising:
   transmitting a request as a multi-path traceroute request (MTRQ) message containing a name prefix from a source application to an upstream node via node faces of nodes in the node fabric along a request path, wherein the node faces successively traversed by the request along the request path are determined by decoding a Path Steering Value (PSV);
   determining at the upstream node at least one next node face connecting the upstream node to a next upstream node according to a Forwarding Information Base (FIB);
   receiving at the source application from the upstream node a reply that includes a multi-path traceroute reply (MTRP) message together with a node face identifier of the at least one next node face, wherein the reply travels along a return path encoded in the PSV, wherein the PSV is generated by pairwise encoding pairs of node face identifiers along the return path and is represented by a deterministically decodable pairing function; and
   selecting one of the at least one next node face and creating an updated PSV by pairing the PSV of the return path with the node face identifier of the at least one next node face.

2. The method of claim 1, wherein the PSV for each node along the return path is encoded by overwriting a previous PSV with a new PSV which pairs a node face of a most recently traversed node with the previous PSV.

3. The method of claim 1, wherein the upstream node on the request path decodes the PSV and retrieves therefrom a node face identifier for forwarding the request to a next upstream node.

4. The method of claim 1, wherein in absence of a valid node face in the decoded PSV, the node faces via which the request travels from the source application to the upstream node are assigned by the Forwarding Information Base (FIB).

5. The method of claim 1, wherein the deterministically decodable pairing function is selected from a Cantor function, a Hopcroft and Ullman variant of the Cantor function, Hilbert curve algorithm, Morton code, and a bitwise pairing function.

6. The method of claim 1, wherein the source application is a requestor sending along an interest path an interest message requesting content data based on a name in the interest message and one of the upstream node contains the content data; and wherein the reply is a content message with the requested content data transmitted downstream to the requestor along the return path encoded in the PSV.

7. The method of claim 6, further comprising the requestor sending a second interest message along the interest path corresponding to the return path previously encoded in the PSV in the reply message.

8. The method of claim 6, wherein, when a node along the interest path detects that a node face decoded from the PSV is invalid, the detecting node steers the interest message via a different interest path assigned by a Forwarding Information Base (FIB).

9. The method of claim 6, wherein, when a node along the interest path detects that a node face decoded from the PSV is invalid, the detecting node generates an interest return message (NACK) rejecting a previously received interest message.

10. The method of claim 1, further comprising:
further comprising:
repeating the transmitting, the determining, the receiving, and the selecting with the updated PSV until a full network path in the network fabric for the name prefix in the MTRQ across the selected node face has been discovered.

11. The method of claim 10, wherein each MTRQ comprises a hop limit indicating a maximum number of node faces to be traversed, and wherein the MTRP is returned when either the hop limit is reached or PSV=0.

12. The method of claim 10, further comprising, after the full network path has been discovered, selecting another of the at least one node face and repeating the transmitting, the determining, the receiving, and the selecting with the other selected node face until the full network path for the name prefix in the MTRQ across the other node face has been discovered.

13. An system comprising:
a source comprising an information-centric network (ICN) treetrace tool directly or indirectly connected in a node fabric of an ICN to an upstream node by way of at least one node face of a node,
the source configured to transmit a request as a multi-path traceroute request (MTRQ) message containing a name prefix to an upstream node via node faces of nodes in the node fabric along a request path, wherein the node faces successively traversed by the request along the request path are determined by decoding a Path Steering Value (PSV);
wherein the upstream node is configured to determine at least one next node face connecting the upstream node to a next upstream node according to a Forwarding Information Base (FIB); and
wherein the source is configured to:
receive from the upstream node a reply that includes a multi-path traceroute reply (MTRP) message together with a node face identifier of the at least one next node face, wherein the reply travels along a return path encoded in the PSV, wherein the PSV is generated by pairwise encoding pairs of node face identifiers along the return path and is represented by a deterministically decodable pairing function; and
select one of the at least one next node face and create an updated PSV by pairing the PSV of the return path with the node face identifier of the at least one next node face.

14. The system of claim 13, further comprising the Forwarding Information Base (FIB) assigning a node face for transmitting a request in absence of a valid PSV.

15. The system of claim 13, wherein the deterministically decodable pairing function is selected from a Cantor function, a Hopcroft and Ullman variant of the Cantor function, Hilbert curve algorithm, Morton code, and a bitwise pairing function.

16. The system of claim 13, wherein the source is further configured to:
repeat the transmit, the determine, the receive, and the select operations with the updated PSV until a full network path in the network fabric for the name prefix in the MTRQ across the selected node face has been discovered.

17. The system of claim 16, wherein each MTRQ comprises a hop limit indicating a maximum number of node faces to be traversed, and wherein the MTRP is returned when either the hop limit is reached or PSV=0.

18. A tangible non-transitory computer readable medium storing program instructions that cause a computer to execute a process for path routing in a node fabric of an information-centric network (ICN), the process comprising:
transmitting a request as a multi-path traceroute request (MTRQ) message containing a name prefix from a source application including an ICN treeetrace tool to an upstream node via node faces of nodes in the node fabric along a request path, wherein the node faces successively traversed by the request along the request path are determined by decoding a Path Steering Value (PSV);
determining at the upstream node at least one next node face connecting the upstream node to a next upstream node according to a Forwarding Information Base (FIB);
receiving at the source application from the upstream node a reply that includes a multi-path traceroute reply (MTRP) message together with a node face identifier of the at least one next node face, wherein the reply travels along a return path defined by the PSV, wherein the PSV is generated by pairwise encoding pairs of node face identifiers along the return path and is represented by a deterministically decodable pairing function; and
selecting one of the at least one next node face and creating an updated PSV by pairing the PSV of the return path with the node face identifier of the at least one next node.

19. The tangible non-transitory computer readable medium of claim 18, wherein the deterministically decodable pairing function is selected from a Cantor function, a Hopcroft and Ullman variant of the Cantor function, Hilbert curve algorithm, Morton code, and a bitwise pairing function.

20. The tangible non-transitory computer readable medium of claim 18, wherein the process further comprises:
repeating the transmitting, the determining, the receiving, and the selecting with the updated PSV until a full network path in the network fabric for the name prefix in the MTRQ across the selected node face has been discovered.

* * * * *

UNITED STATES PATENT AND TRADEMARK OFFICE

CERTIFICATE OF CORRECTION

PATENT NO. : 10,291,512 B2
APPLICATION NO. : 15/479144
DATED : May 14, 2019
INVENTOR(S) : Ilya V. Moiseenko et al.

It is certified that error appears in the above-identified patent and that said Letters Patent is hereby corrected as shown below:

In the Claims

Claim 10, Column 15, Line 7, please delete "further comprising:"

Signed and Sealed this
Sixteenth Day of July, 2019

Andrei Iancu
*Director of the United States Patent and Trademark Office*